G. G. JONES.
DEVICE FOR REMOVING TIRES FROM RIMS.
APPLICATION FILED JUNE 13, 1917.

1,352,135.

Patented Sept. 7, 1920.

2 SHEETS—SHEET 1.

Inventor
George G. Jones,
By Bates & Macklin
Attys.

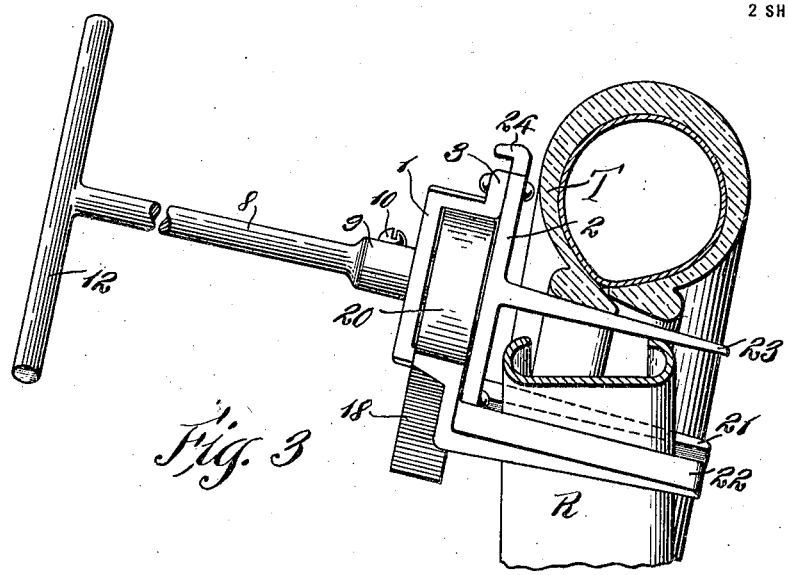
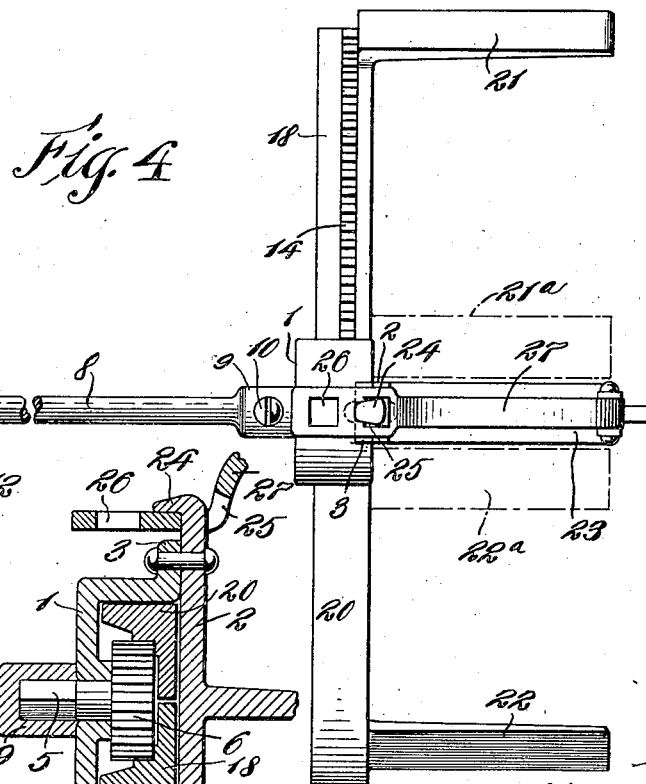

UNITED STATES PATENT OFFICE.

GEORGE G. JONES, OF CLEVELAND, OHIO, ASSIGNOR TO INDUSTRIAL RESEARCH CORPORATION, OF TOLEDO, OHIO, A CORPORATION OF DELAWARE.

DEVICE FOR REMOVING TIRES FROM RIMS.

1,352,135. Specification of Letters Patent. Patented Sept. 7, 1920.

Application filed June 13, 1917. Serial No. 174,426.

*To all whom it may concern:*

Be it known that I, GEORGE G. JONES, a citizen of the United States, residing at Cleveland, in the county of Cuyahoga and State of Ohio, have invented a certain new and useful Improvement in Devices for Removing Tires from Rims, of which the following is a full, clear, and exact description, reference being had to the accompanying drawings.

The general object of this invention is to provide a simple effective and easily operable tool for removing demountable tires from their rims. Another object is to so construct the device that it may also be useful for placing the tires on the rims. Still another object is to so arrange the tool that it may be disassembled and adapted to occupy a minimum space in a tool box.

My invention is hereinafter more fully described in connection with the accompanying drawings, and the essential characteristics are set forth in the claims.

Figure 1:
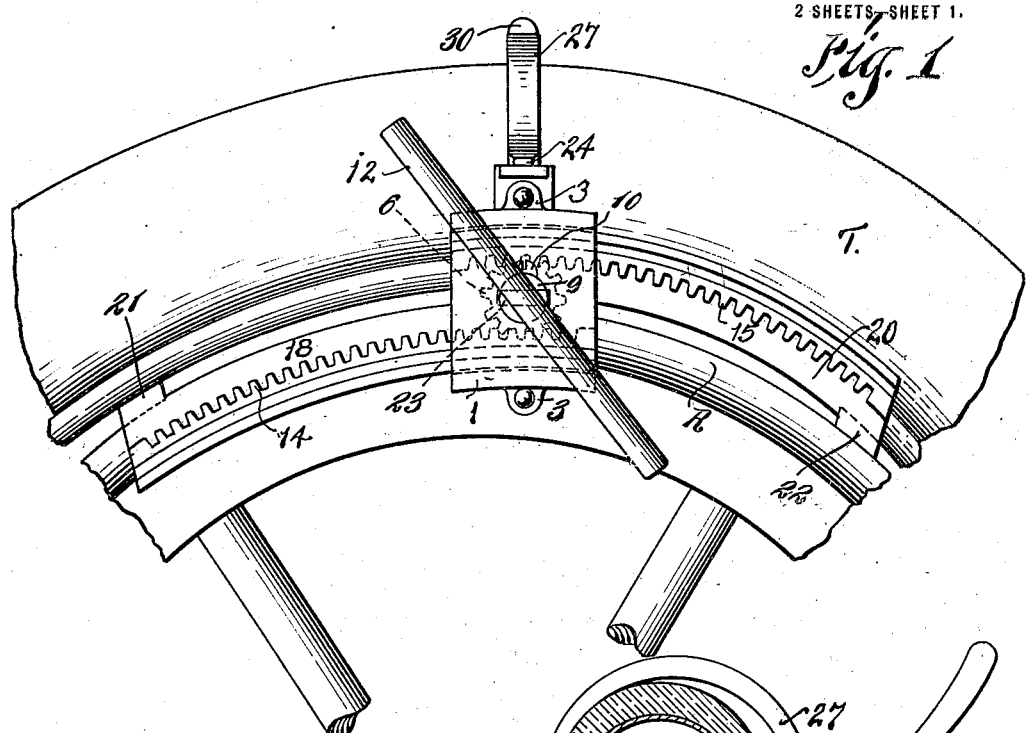
Figure 2:
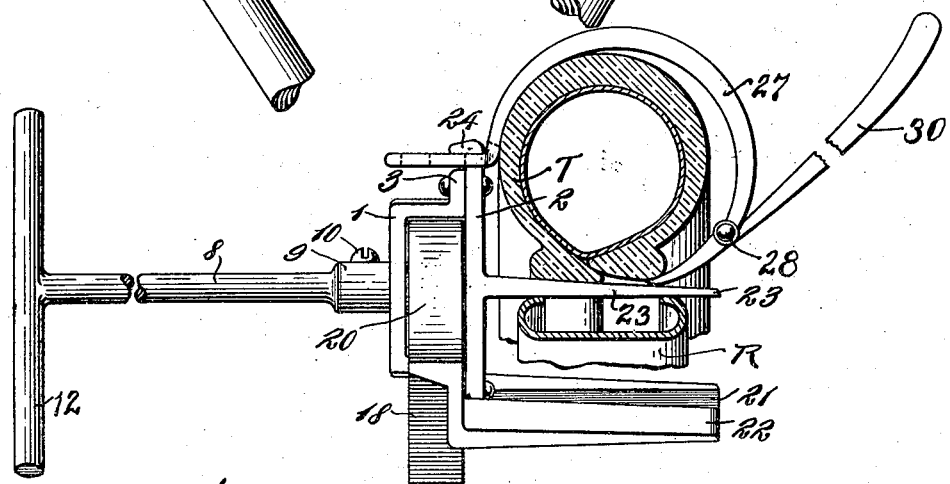

In the drawings, Figure 1 is a side elevation of my device in operation; Fig. 2 is an end elevation of the same, showing a rim and tire in section and being operated upon by the tool; Fig. 3 is an end elevation of the tool and cross section of a tire and rim, illustrating the final step of the removing operation; Fig. 4 is a plan of the tool, illustrating the two positions of the separable fingers; Fig. 5 is a transverse section through the tool on the plane of the axis of the operating gear.

I have found in removing tires, particularly pneumatic tires, from rims having side flanges, that considerable difficulty is encountered in thrusting a tool under the tire to raise it from the rim, and subsequently thrusting one or more tools under the tire at separated points, and that even when this is accomplished, all of these must be tipped at one time to throw the tire from the rim. Accordingly, I have provided a device having separable fingers in the form of thin wedge-like members adapted to be brought together and thrust under the tire at one point and then separated by a suitable mechanism providing convenient application of power, separating these fingers which extend across and rest on both flanges, thus raising the tire from the rim along a considerable portion of its circumference, whereupon the tire may readily be removed by tipping or tilting the device bodily, prying the tire transversely off the rim.

Describing the parts by reference numerals, 1 indicates a housing comprising a casing member and a front vertical closure 2 secured to ears 3 of the housing by suitable rivets, as shown. At the central portion of the housing is provided a bearing for a stub shaft 5 of a spur gear 6 rotated by the engagement of a socket wrench 8 having an angular recess in an enlarged head 9, embracing an angular portion of the shaft 5 outside the housing and removably secured thereto by a screw indicated at 10. The handle is provided with a transverse head indicated at 12, which may be grasped by the hands for turning the gear 6.

The gear engages at opposite sides with arcuate racks 14 and 15 formed on arcuate arms 18 and 20 respectively extending slidably through the housing. At the outer end of each arm is a laterally extending wedge-shaped finger as shown at 21 and 22 respectively, which may be brought together at each side of a rigid finger 23 on the housing cover 2, as shown in broken lines at 21$^a$ and 22$^a$.

At the upper side of the housing the cover 2 is extended upwardly and has a laterally turned hook-like projection 24 which may engage either of two openings 25 or 26 in an enlarged end portion of arcuate arm 27 adapted to extend over the tire and carrying at its opposite end a pivot pin 28 for a lever 30.

My invention will be better understood from the following description of its operation: At R is indicated a rim having inwardly turned flanged sides, shown as illustrative of any form of flanged rim. At T is indicted a tire of the clencher type having beads at the base portion adapted to be embraced by flanges of the rim. The fingers 21, 22 and 23 are brought together by turning the handle, and then the lever 30 is operated against the opposite side of the tire and at the same time the fingers are given a prying action by swinging the handle 8 up and down until the fingers have been thrust beneath the tire and raised onto the tops of the flanges. Thus the bead of the tire nearest the housing is raised by the fingers themselves, while the opposite bead is raised by the end of a lever 30. The result is that the tire is raised entirely free from the rim at this point. The next step is to revolve the handle 12, which revolves the gear 6 and moves the arms 18 and 20 outwardly by reason of engagement with the racks forcing the fingers 21 and 22 along the rim to positions indicated in solid lines in the drawings. The arm 27 is now detached and the tire completely removed from the rim by tipping the device, using the handle as a lever, the fingers engaging the rim at three separated points. This frees a length of tire from the rim sufficient to cause the beads to become entirely freed as the tool throws the adjacent portion of the tire off the rim.

The tool may also be used for placing tires onto the rim. To use it in this manner, the tire is placed by hand onto approximately half of the rim and with a tool, somewhat in the position shown in Fig. 3, the opposite half of the tire is drawn upwardly onto the three separated fingers which are then brought downwardly into engagement with the tops of the flanges. By operating the handle, the fingers are then brought together, thus leaving the tire in engagement with the rim for a greater portion of its circumference. The fingers may be entirely removed by merely drawing downwardly on the handle, permitting the tire to assume its normal position on the rim.

From the foregoing description, it will be seen that I have provided a tire removing tool which may not only be conveniently operated, but which may be disassembled and conveniently placed in the tool box. That is, the handle may be removed by loosening the screw 10 and the arm 27 merely removed from the hook 24. The opening 26 in the hook is to permit the lever 30 to operate on a tire larger in size than that conveniently operated on when extending into the opening 25.

Having thus described my invention, what I claim is:

1. In a tire removing tool, the combination of a plurality of parallel separable fingers adapted to be thrust under both beads of the tire between them and both flanges of the rim, and means for causing the separation of such fingers laterally and in an arc practically corresponding to the periphery of the rim while preserving their parallelism and while they are between the tire and rim.

2. In a tool of the character described, the combination of a pair of concentric arcuate arms having gear teeth on their proximate edges, means for guiding said arms to enable them to move within the same plane and each in its own arc in said plane, a gear meshing with said teeth for causing such movement, and tire engaging fingers carried by said arms and projecting from them at substantially right angles to said plane of movement for a distance sufficient to extend beneath both beads of a clencher tire.

3. In a tool of the character described, the combination of a pair of concentric arcuate arms having gear teeth on their proximate edges, means for guiding said arms to enable them to move within the same plane and each in its own arc in said plane, a gear meshing with said teeth for causing such movement, and tire engaging fingers carried by said arms and projecting from them at substantially right angles to said plane of movement, the fingers of both arms traveling in substantially the same cylindrical path, the arc of which is substantially midway between the arcs of the two sets of teeth.

4. In a tire removing tool, the combination of three fingers side by side and all adapted to be thrust between a tire and rim, and means for causing the extreme fingers while constantly remaining in parallelism to approach or recede from the intermediate finger laterally in an arc approximately corresponding to the periphery of the rim.

5. In a tire removing tool, the combination of an intermediate and two extreme fingers all parallel and standing side by side in an arc and adapted to be thrust between the tire and rim, two arcuate arms each carrying one of the extreme fingers, a member embracing both of said arms, and means carried by the member for drawing them together laterally or causing their separation.

6. In a tire removing tool, the combination of a housing having a rigid finger, a pair of concentric arcuate arms extending through the housing, a pair of fingers carried by the arms and extending at an angle to the plane of movement of the arms, racks on said arms, a gear engaging said racks, and means for actuating said gear to move the arms and carry the fingers supported thereon toward or from the rigid finger.

7. In a tire removing tool, the combination of a pair of concentric arcuate arms, each having a rack, a gear engaging said racks for moving the arms with relation to each other, a member guiding the racks and forming a bearing for the gear in front of the gear, means for rotating the gear, a rigid finger projecting from said member at the rear of the gear, and movable fingers projecting at substantially right angles to the plane of movement of said arms and being substantially parallel in all positions.

8. In a tire removing tool, the combination of a frame, a finger carried thereby, a pair of concentric arcuate racks slidably carried by the frame, a pinion geared with said racks, fingers carried by said racks respectively on opposite sides of the finger first mentioned, all of said fingers being subtantially parallel and located substantially the same radial distance from the common center of said concentric racks and being adapted to be thrust as a unit between a rim and both beads of a tire, and a projecting handle operating to rotate the pinion and serving to move the three fingers as a pry in coaction with the tire.

9. In a tire removing tool, the combination of a frame, a pair of movable fingers carried thereby and adapted to be thrust between the tire and rim, an arcuate arm connected with said frame and adapted to extend over the tire, and a lever pivoted to said arm adapted to engage the tire to facilitate thrusting the fingers therebeneath.

10. In a device of the character described, the combination of a frame, a plurality of fingers carried thereby to be thrust between the tire and rim, means for moving said fingers together and for separating them, a member extending across the tire and connected with the frame, and a lever pivoted at the end of said member.

11. In a device of the character described, the combination of a frame, a plurality of fingers carried thereby and adapted to be thrust between a tire and rim, means for moving said fingers together or separating them, a member connected with the frame and extending crosswise of the tire, and means carried by said member for pressing against the opposite side of the tire.

12. The combination of a frame provided with a handle, a rigid finger carried by the frame, a pair of movable fingers carried by the frame, means for moving said fingers to cause them to approach or recede from the intermediate finger, an arc-shaped member connected with the frame and adapted to extend over the tire, and means carried by the arc-shaped member for drawing the fingers beneath the tire beads.

13. The combination of an arc-shaped member adapted to extend across a tire, means carried at one end of said member for engaging and forcing inwardly the bead of the tire on one side, and a device carried by the other end of said arc-shaped member and adapted to enter between the rim and tire and pry the tire off the rim, said last mentioned device comprising two fingers, and means for moving said fingers toward or away from each other in a path approximating the periphery of the rim.

In testimony whereof I hereunto affix my signature.

GEORGE G. JONES.